(12) United States Patent
Minnoy et al.

(10) Patent No.: US 9,331,525 B2
(45) Date of Patent: May 3, 2016

(54) ENERGY ACCESS CONTROL

(75) Inventors: Chris Minnoy, Holsbeek (BE); Valentin Aurelian Mesaros, Limelette (BE)

(73) Assignee: SONY CORPORATION, Tokyo (JP)

( * ) Notice: Subject to any disclaimer, the term of this patent is extended or adjusted under 35 U.S.C. 154(b) by 1071 days.

(21) Appl. No.: 13/347,855

(22) Filed: Jan. 11, 2012

(65) Prior Publication Data

US 2012/0205990 A1    Aug. 16, 2012

(30) Foreign Application Priority Data

Feb. 11, 2011  (GB) .................................. 1102454.4

(51) Int. Cl.
*H02J 13/00*  (2006.01)
*B60L 11/18*  (2006.01)
*H02J 3/14*   (2006.01)

(52) U.S. Cl.
CPC ......... *H02J 13/0079* (2013.01); *B60L 11/1844* (2013.01); *H02J 3/14* (2013.01); *H02J 2003/143* (2013.01); *Y02B 70/3225* (2013.01); *Y02B 70/3266* (2013.01); *Y04S 20/222* (2013.01); *Y04S 20/242* (2013.01); *Y10T 307/766* (2015.04)

(58) Field of Classification Search
None
See application file for complete search history.

(56) References Cited

U.S. PATENT DOCUMENTS

| 4,336,462 | A  | * | 6/1982  | Hedges et al. .................. 307/35 |
| 5,483,656 | A  | * | 1/1996  | Oprescu et al. ............... 713/320 |
| 5,752,046 | A  | * | 5/1998  | Oprescu et al. ............... 713/300 |
| 6,018,690 | A  | * | 1/2000  | Saito et al. .................... 700/295 |
| 6,301,674 | B1 | * | 10/2001 | Saito et al. .................... 713/340 |
| 6,925,363 | B2 | * | 8/2005  | Hutton .......................... 700/295 |
| 8,160,752 | B2 | * | 4/2012  | Weaver et al. ................. 700/295 |
| 8,364,609 | B2 | * | 1/2013  | Ozog ............................. 705/412 |
| 8,665,111 | B2 | * | 3/2014  | Wang et al. .............. 340/870.02 |
| 2003/0036820 | A1 |   | 2/2003  | Yellepeddy et al. |
| 2003/0126060 | A1 |   | 7/2003  | Lof et al. |
| 2004/0075343 | A1 |   | 4/2004  | Wareham et al. |
| 2005/0127855 | A1 |   | 6/2005  | Wobben |
| 2007/0043478 | A1 | * | 2/2007  | Ehlers et al. .................. 700/276 |
| 2007/0222295 | A1 |   | 9/2007  | Wareham et al. |
| 2008/0281473 | A1 |   | 11/2008 | Pitt |

(Continued)

FOREIGN PATENT DOCUMENTS

EP    1 367 685 A1   12/2003
JP    2000-32658 A    1/2000

(Continued)

OTHER PUBLICATIONS

Extended European Search Report issued Apr. 18, 2012 in Patent Application No. 12150300.7

(Continued)

*Primary Examiner* — Christopher E Everett
(74) *Attorney, Agent, or Firm* — Oblon, McClelland, Maier & Neustadt, L.L.P.

(57) ABSTRACT

A method of controlling access to an electrical power network, comprising: receiving a power network access rule from a power network, the power network access rule defining an access condition which permits a device to access the power network; receiving a device usage rule, the device usage rule being a condition when the device is permitted use of the power network; comparing the device usage rule with the received power network access rule; and permitting the transfer of energy between the power network and the device upon a positive comparison between the device usage rule and the power network access rule.

29 Claims, 5 Drawing Sheets

(56) References Cited

U.S. PATENT DOCUMENTS

| | | |
|---|---|---|
| 2009/0043520 A1* | 2/2009 | Pollack et al. .................. 702/62 |
| 2009/0177595 A1 | 7/2009 | Dunlap et al. |
| 2010/0217550 A1* | 8/2010 | Crabtree et al. ................ 702/62 |
| 2011/0184579 A1* | 7/2011 | Nilsen et al. .................. 700/295 |
| 2011/0251730 A1 | 10/2011 | Pitt |

FOREIGN PATENT DOCUMENTS

| | | |
|---|---|---|
| JP | 2003-88002 A | 3/2003 |
| JP | 2003-88004 A | 3/2003 |
| JP | 2004-88824 A | 3/2004 |
| JP | 2004-219181 A | 8/2004 |
| JP | 2008-289276 A | 11/2008 |
| WO | WO 2008/156735 A1 | 12/2008 |
| WO | WO 2010/081165 A2 | 7/2010 |

OTHER PUBLICATIONS

United Kingdom Search Report and Written Opinion Issued Jun. 8, 2011, in Great Britain Patent Application No. 1102454.4, filed Feb. 11, 2011.

Office Action issued Sep. 8, 2015 in Japanese Patent Application No. 2012-027730.

* cited by examiner

ENERGY ACCESS CONTROL

BACKGROUND OF THE INVENTION

1. Field of the Invention

The invention relates to a method and associated apparatus for controlling access to an electrical power network.

2. Description of the Prior Art

Typically, if one needs to charge an electrical device, for example a laptop or mobile phone, one will do this at home. Although, some environments, for example airports and trains, may allow people to charge small electrical items, with an increasing demand on our power infrastructure this may no longer be possible. Furthermore, with the introduction and increased popularity of electric vehicles, the demand on the power infrastructure is becoming further stretched.

US/2009/0177595 describes a metering device allowing electricity exchange between an electric vehicle and the network. However, this document only allows users to sell electricity when the price is a certain level.

Due to this increased load on the power infrastructure, it is becoming more difficult to balance the load on a power network, particularly during peak demand.

Further, most electricity providers provide 100% green electricity to their consumers. This means that the energy provider will guarantee that within the same year it produced the same amount of green electricity that was consumed by a user. However, currently this may only be possible for consumers in their homes. Accordingly, there is a problem that a consumer wishes to be allowed access to so-called green electricity when not in their home.

It is an aim of the present invention to address these problems.

SUMMARY OF THE INVENTION

According to one aspect of the invention there is provided a method of controlling access to an electrical power network, comprising: receiving a power network access rule from a power network, the power network access rule defining an access condition which permits a device to access the power network; receiving a device usage rule, the device usage rule being a condition when the device is permitted use of the power network; comparing the device usage rule with the received power network access rule; and permitting the transfer of energy between the power network and the device upon a positive comparison between the device usage rule and the power network access rule.

This may assist in allowing the load on the network to be balanced or predicted more accurately.

The device usage rule may be received from the device or from an energy provider.

The method may comprise the step of authenticating the device with the electrical power network.

The power network access rule may be determined in accordance with the capacity of the power network.

The method may comprise registering the device with an energy provider before receiving the power network access rule from the network, where the energy provider provides electricity over the power network.

The device usage rule may define the conditions for consuming electricity from the power network or for providing electricity to the power network.

The method may comprising receiving a user-configured usage rule, the user-configured usage rule defining a condition when the device requires use of the power network as defined by a user, comparing the user-configured usage rule with the received power network access rule, and permitting the transfer of energy between the electrical power network and the device upon a positive comparison between the device usage rule and the power network access rule, and the user-configured usage rule and the power network access rule.

The device usage rule may include a predetermined amount of energy consumption of the device.

The power network access rule may include information regarding the voltage and frequency of the energy or the maximum current of the energy.

The method may comprise measuring the amount of electricity that is transferred between the power network and the device, storing a value indicative of the amount of energy transferred; and distributing a report over a network, wherein the report includes the value indicative of the amount of energy transferred. The network may be a home network.

According to another aspect of the invention there is provided a computer program comprising computer readable instructions which when loaded onto a computer, configure the computer to perform a method according to aspects of the invention.

According to another aspect of the invention there is provided a storage medium configured to store the computer program according to aspects of the invention.

According to another aspect of the invention there is an apparatus for controlling access to an electrical power network, comprising: a receiving unit operable to receive a power network access rule from a power network, the power network access rule defining an access condition which permits a device to access the power network and to receive a device usage rule, the device usage rule being a condition when the device is permitted use of the power network; a comparator operable to compare the device usage rule with the received power network access rule; and a permitting unit operable to permit the transfer of energy between the power network and the device upon a positive comparison between the device usage rule and the power network access rule.

The device usage rule may be received from the device or from an energy provider.

The apparatus may comprise an authentication unit operable to authenticate the device with the electrical power network.

The power network access rule may be determined in accordance with the capacity of the power network.

The device usage rule may define the conditions for consuming electricity from the power network or for providing electricity to the power network.

The receiving unit may be operable to receive a user-configured usage rule, the user-configured usage rule defining a condition when the device requires use of the power network as defined by a user, such that the comparator is operable to compare the user-configured usage rule with the received power network access rule, and the permitting unit may be operable to permit the transfer of energy between the electrical power network and the device upon a positive comparison between the device usage rule and the power network access rule, and the user-configured usage rule and the power network access rule.

The device usage rule may include a predetermined amount of energy consumption of the device.

The power network access rule may include information regarding the voltage and frequency of the energy, or maximum current of the energy.

The apparatus may comprise a measuring unit operable to measure the amount of electricity that is transferred between the power network and the device: a storage device operable to store a value indicative of the amount of energy transferred:

and an output unit operable to distribute a report over a network, wherein the report includes the value indicative of the amount of energy transferred. The network may be a home network.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE EXAMPLE EMBODIMENTS

Figure 1:
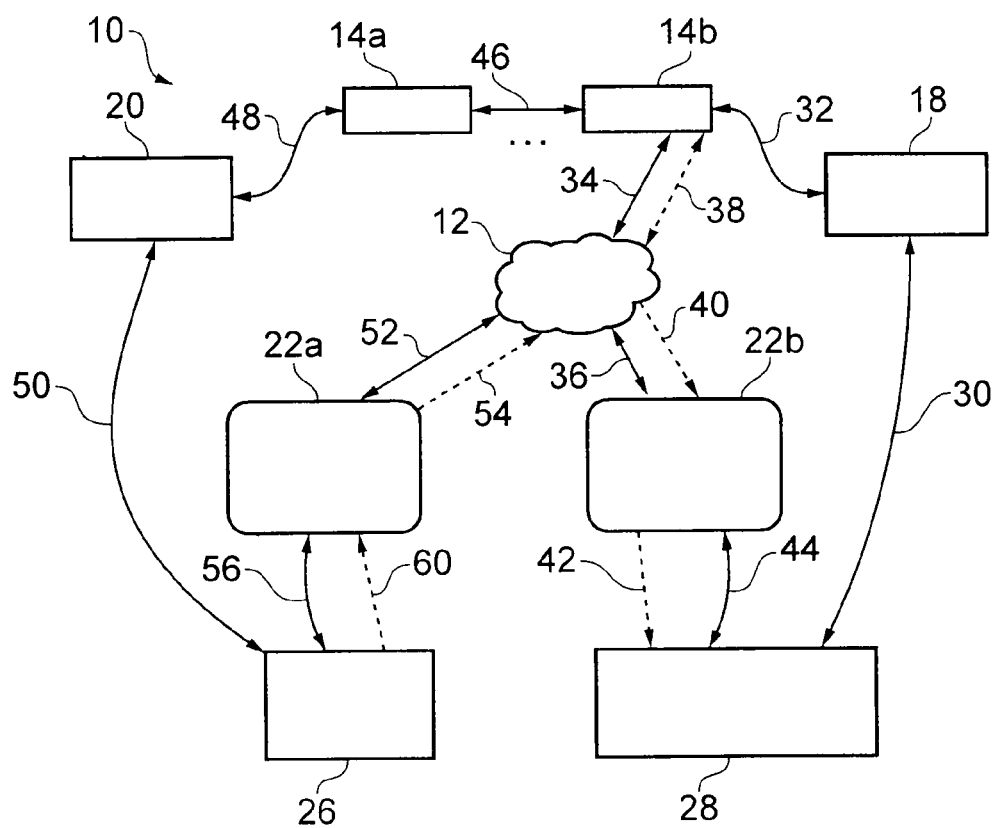
FIG. 1 shows a power distribution network according to an embodiment of the invention.

FIG. 1 shows a power distribution network 10. The power distribution network 10 includes a number of nodes. It will be understood that the number of nodes in the network is not limited to the number shown in the figure. The nodes present in the figure include a power distribution grid 12, distribution grid operators 14a and 14b, energy providers 18, 20, energy access points 22a, 22b and devices 26, 28. Typically devices 26, 28 will be household devices within a residential dwelling, including electric vehicles. However, the devices 26, 28 may also be devices in an industrial setting.

FIG. 1 shows a power distribution network in the form of distribution grid operators and a power distribution grid. However, it will be appreciated that the form and layout of the power grid is not limited to the example shown and that other layouts may be envisaged. The power distribution network may also be referred to as a power grid, or power network.

In the following, the devices 26, 28 will be household devices. As such device 28 includes, for example, a car or portable appliance that requires energy in the form of electricity from an electrical point. Device 26 includes, for example, a solar panel or wind turbine that is able to inject or provide energy in the form of electricity to an electrical point. For the purposes of explaining their function, device 28 will be described as a consuming device and device 26 will be described as a providing device.

The power distribution network 10 is described in two parts. The first part is described in reference to the consuming device 28. The second part of the distribution network is described in reference to the providing device 26. Each of the devices 26, 28 shown FIG. 1 may be capable of providing or consuming electricity, for example the battery in an electric car. Furthermore, the energy access points may be capable of providing, receiving or providing and receiving electricity.

In FIG. 1, the various connections between the nodes are shown as either solid lines or dashed lines. The solid lines represent a communication channel. The dashed lines represent a power line. It will be understood that each of the communications channels and power lines may be one-way, or two-way depending on the specific arrangement used.

Referring to the consuming device 28, details of the consuming device 28 are communicated to an energy provider 18 to allow the device to be registered with the energy provider 18. The details for the consuming device may include the type of device, manufacturer/model or the chosen payment method, for example. As shown in FIG. 1, the communication is illustrated by the solid line 30. Depending on the nature of the consuming device 28, the communication might be performed using the device. For example a mobile phone may communicate directly with the energy provider. Alternatively, if the consuming device 28 is incapable of communicating with the energy provider directly, for example a household appliance, the registration process might be performed via a computer on a network. The registration process may also form part of the purchase of the appliance or may be performed on an access point provided by the energy provider. During the registration process, a set of usage rules are communicated to the device. In addition to the usage rule, a set of credentials, such as a registration proof, access keys and a digital certificate might also be communicated to the device. The usage rules are typically defined by the energy provider and define the conditions when the device may obtain energy from the network. This may assist in allowing the load on the network to be balanced or predicted more accurately.

Alternatively, when a user registers with an energy provider, the user is provided with a token (electronic, paper or other means). The user may set up a device or devices locally using the token. In this example the token contains the usage rules that would apply to any device or group of devices. Therefore, the rules are not necessarily tailored towards a specific device, rather a group of devices.

The access keys may be in the form of public/private key pairs. A digital certificate may also be used with the public/private key pairs (also known as a public key certificate), which is an electronic document which uses a digital signature to bind a public key with an identity. The identity may be the name of the person registering the device. The digital certificate may then be used to verify that a public key belongs to an individual.

Alternatively, the access keys may be in the form of a secret key (or other form of appropriate key corresponding to a cryptographic algorithm employed in the system). For example, if public cryptography is used, these access keys will be unique to the device. The access keys may be used for encrypting and signing for secure communication with an energy access point. The access keys may be generated by the energy provider or by any third party trusted key provider. In this example the energy provider will sign the usage rules with a private key.

In addition to issuing usage rules and device credentials, the energy provider may also include a mechanism to revoke the device credentials and the usage rules, such that the device may not be permitted access to transfer energy after the device has completed the registration procedure, if the devices credentials and usage rules are revoked.

The usage rules include, for example, accessibility hours or energy consumption limits at peak times. It will be appreciated that the usage rules might not be limited to the specific examples given. However, it will be understood the usage rules may include any form of rule that permits the transfer of energy to the device according to some predetermined criteria. For example, the usage rules may include a set tariff for the energy. The usage rules, registration proof and digital certificate are typically stored within the consuming device 28 in a memory (not shown). Depending on the device, the memory may be a solid state memory (e.g., ROM or RAM), or other type of memory device incorporated in the device 28 specifically for storing the usage rules, registration proof and digital certificate. However, if the device is capable of storing data, e.g., a mobile phone or laptop, the usage rules, registration proof and digital certificate may be stored within the device memory. These may be encrypted before storage or may be stored on secure memory.

In addition to the usage rules, the user may set their own usage rules, referred to as user-configured usage rules (or extended usage rules). The device 28 is a consuming device therefore, the user-configured usage rules will be particular to energy consumption. These user-configured usage rules may include a preferred period of time to transfer energy or only consume energy if it is below a specified price, for example. However, it will be appreciated that other user-configured usage rules are permitted. For example, a user-configured usage rule may include only permitting the transfer of green-energy. Green-energy typically excludes energy produced by burning of fossil fuels or using nuclear energy. For example, green-energy includes renewable sources such as wind, solar or tidal and other reduced $CO_2$ sources of energy that use recycled sources such as bio waste. The user-configured usage rules may be set using an interface provided by the energy provider, via a computer which is connected to the device either directly, using an input device connected to the device (e.g. keyboard), or using the Internet. In this example the user-configured rules are signed using a private key of the device.

The user-configured usage rules may also include a device's known consumption requirements. For example it may be possible to determine the amount of energy required to fully charge a battery (e.g. mobile phone or laptop battery). Accordingly, the device can report, using the user-configured usage rule, the energy access point the amount of energy that will be consumed during the charging cycle. The user-configured usage rule may be in the form of a maximum current and a specified amount of time. This will also allow for improved load balancing on the grid because the grid can determine the usage requirement for a given period of time.

During the registration process a proof of registration is produced by the energy provider, which is stored by the device, for example. The registration proof may include an energy account identification, an energy provider identification and a device identification. The registration proof may further include a description or role of the device, a registration date/expiration date and may include a priority. For example, devices may be assigned a priority number from 1 to 3 (1 being high and 3 being low). That is to say a mobile phone may be assigned a low priority (e.g. 3) and an electric vehicle may be assigned a high priority (e.g. 1). The priority rating may determine when the device may transfer energy or to which energy access point the device can be connected. In this example the registration proof is signed using the energy provider's private key (i.e. the same private key used to sign the usage rules). Since, the usage rules and the registration proof have been signed by the energy provider's private key, the corresponding public key is distributed to the energy access points around the distribution network (e.g., energy access point 22b). The public key allows authenticating or verification of the usage rules and the registration proof by the energy access point 22b. The authentication or verification is carried out by using the public key corresponding to the energy provider's private key that has been used to originally sign the registration proof.

In this embodiment, a device is described as being registered with a single energy provider. However, it is envisaged that a device may be registered with multiple energy providers such that one of the energy providers may be selected according the user-configured usage rules.

The energy provider 18 is in communication with a distribution operator 14b. The communication between the energy provider 18 and the distribution operator 14b is illustrated by the solid line 32. The communication may be performed over the Internet, where each node (i.e., the energy provider 18 and the distribution operator 14b) may have a specific Internet Protocol (IP) address. Alternative methods of communication may be used. The communication between the energy provider 18 and the distribution operator 14b may be via any form of wired or wireless network.

The distribution operator 14b, for example, includes a company that manages and maintains the power grid nationally and regionally for a given geographical area or location. In this specific example, the distribution operator 14b is different from the energy provider 18, where the distribution operator 14b provides the distribution network for the energy, and the energy provider buys electricity and sells it to consumers. The distribution operator 14b may also be in communication with one or more other distribution operators 14a, to allow roaming across multiple power networks or power grids. Each distribution operator may also be electrically connected to other distribution networks. It will be understood that other forms of power networks are possible. For example, the energy provider may maintain and distribute the electricity, such that a device is registered with the distribution operator who is also the energy provider.

The energy provider 18 is registered with the distribution operator 14b to allow registered devices to access electricity. In this respect, the energy provider transfers the data required by an energy access point to authenticate a device. For example, data that is required to perform digital signature verification is communicated to the distribution operator 14b. This data might be in the form of a public key, as discussed above that is used to verify the authentication of the usage rules and registration proof.

An energy access point 22b is in communication with the distribution operator 14b via a local grid 12. The communication between the distribution operator 14b and the energy access point is illustrated by the solid black lines 34, 36. The local grid may be represented by an electrical network between residential homes and a sub-station (e.g. a step-down transformer) for example. Typically, the local network transfers electricity at mains voltage, such as 240 volts in Europe and 110 volts in the United States. However, it will be appreciated that the form and layout of the grid and the distribution operator will vary depending on location and is not considered to be limiting to the present invention.

The communication between the distribution operator 14b and the energy access point 22b may also be over the Internet, where the energy access point is assigned an IP address. Alternatively, the communication may be accomplished using the power grid itself, for example, a transmission may be sent using the electrical power lines or fibres within the power lines.

The energy access point 22b may be an electrical outlet in the home or an electrical outlet in a public place such as an airport or train. It will be appreciated that if the energy access point is made available in a home, the consumer unit may be the energy access point, rather than individual electrical outlets. Alternatively, the energy access point may be included in a so-called smart meter located within the power infrastructure in a residential environment.

The energy access point 22b will receive from the distribution operator 14b, via the local network 12, the data (e.g. . a public key) required to perform the digital signature verification of the device 28 that has been registered with the energy provider 18. The energy access point 22b also receives one or more access rules, set by and received from the distribution operator via the local network 12. The access rules may include for example, peak times of usage or times in the day where specific devices are not permitted to consume electricity from the access point 22b. Furthermore, the access rules may also include for example, the cost of the electricity, which may be set by the energy provider 18 and incorporated into an access rule provided by the distribution provider 14b. The access rule may be set based on the capacity of the distribution network or power network. In other words the amount of energy that can be provided by the power network during a specified period of time (i.e. the power network's capacity) may be used to determine the access rules. This may assist in allowing the load on the network to be balanced. Access rules can also place a constraint on the maximum current each node can consume in a power network (e.g., charge pole in a parking lot)

The distribution operator may use a mechanism to revoke the access rules. The capacity of the power network may also take into account known consuming devices sources that periodically consumes the same amount of electricity in a given period of time. In this example the distribution operator will sign the access rules using a private key of the distribution operator. The distribution operator's public key will be communicated to the energy access point 22b to allow for authentication of the access rules using the distribution operator's public key.

The access rules may contain information that allows devices to actively assist in the control of the power quality of the grid, for example access rules may contain information regarding the voltage and frequency of the electricity.

The energy access point 22b includes a storage device (not shown) for storing the data for performing the digital signature authentication for the device and verifying the access rules and usage rules. In this example the energy access point also stores the public keys for the energy provider and the distribution network to allow authentication of the registration proof, the usage rules and the access rules. It will be appreciated that the energy access point 22b, may also store the data (e.g., public keys) for performing the digital signature authentication of other devices registered with other energy providers. The energy access point may store a set of access rules from one or more distribution operators. Also stored in the energy access point may be a revocation list for keys, and usage/access rules that have been revoked to prevent the transfer of energy to a device when one or more of the keys, or rules have been revoked.

Both the access rules and the eligible energy providers (i.e., the energy providers registered with the distribution operator) are regularly updated by the distribution operator 14b. This is achieved by periodically transmitting data to the energy access point 22b, which includes the access rules and the data (e.g. public key) for performing the digital signature authentication. This means that the energy access point 22b is not required to store a list of registered devices; rather only a public key from the energy provider 18 is stored and used to authenticate the device 28. This reduces storage space used within the energy access point 22b. It will be understood that the same public key may be used to authenticate other devices registered with the energy provider 18. Public keys from other energy providers registered with the distribution operator 14b may also be transmitted to the energy access point 22b to allow a device registered with the respective energy provider to be permitted access to electricity.

The energy access point may not be in continuous online connection with the distribution operator or a user account database (e.g. located at the energy provider). That is, any decisions made by the energy access point, as discussed below, may be made using local information or data. By decoupling the energy access point and the device, user privacy and anonymity is maintained while accessing energy in different locations.

The energy access point 22b is also electrically connected with the distribution operator via the local network 12. This is illustrated by the dashed lines 38, 40. This electrical connection may be in the form of low (e.g. 240 Volts), medium (e.g. 33 k Volts) or high voltage (e.g. greater than 110 k Volts) lines depending on the particular power infrastructure. It will be understood that the energy access point will be provided with electricity irrespective of a device being connected. That is to say that it is not the distribution operator that determines whether or not the transfer of electricity to a device is permitted, rather the energy access point permits electricity to be transferred to the device 28.

The consuming device 28 is connected to an energy access point when the transfer of energy is required. In other words, the user plugs the device into the energy access point 22b, which may be in the form of a standard electricity outlet. For example, in the United States this would be a standard two-pin connector (Type A and B) or in the UK a standard three-pin connector (Type G). However, this will also depend on the nature of the device. The electrical connection between the consuming device 28 and the energy access point 22b is illustrated by the dashed line 42. In addition to the electrical connection 42, there may also be a separate communication line, as illustrated by the solid line 44. The communication line 44 may be in the form of a wireless connection, for example, Bluetooth, Zigbee, Wi-Fi or infrared. The communication line may be a separate cable, for example an Ethernet cable. It may also be possible to use a form of power-line communication such as Home Plug ensuring that no separate wired or wireless connection is required.

Once the device 28 is connected to the energy access point 22b and communication is established, the device 28 is authenticated with the energy access point 22b. The energy access point receives from the device 28 the registration proof stored in the device 28. The registration proof from the device 28 is used by the energy access point 22b to perform digital signature authentication using the stored public keys. The device 28 may also store a public key received from the energy provider, which is communicated to energy access point 22b with the registration proof. It will be understood that the authentication process may not be necessary, for example, in the home where it is unlikely that someone will be attempting to obtain electricity unlawfully.

It will be understood that so-called legacy devices will operate in the usual manner. That is to say that legacy devices that are incapable of authentication will operate as normal. Modern devices that are connected to the electricity network without an energy access point will assume that energy can be transferred based on usage rules and user-configured usage rules.

After the device 28 is authenticated with the energy access point 22b, the usage rules stored in the device 28 are compared with or evaluated against the access rules stored in the energy access point. If there is a positive comparison or successful evaluation, the transfer of energy between the consuming device 28 and the energy access point 22b is permitted. In other words, if the usage rules stored in the consuming device 28 match the access rules stored in the energy access point 22b, electricity is supplied to the device 28.

If the device 28 includes user-configured usage rules for consumption these will also be compared with or evaluated against the access rules. It will be understood that the user-configured usage rules will be authenticated using the device's public key, which is communicated to the energy access point. If there is a positive comparison or successful evaluation after both the usage rules and the user-configured usage rules are compared with or evaluated against the access rules, the transfer of energy is permitted. The user-configured usage rules cannot override the usage rules. However, if there is positive comparison between the usage rules and the access rules, but a negative comparison between the user-configured usage rules and the access rule, then the transfer of energy is not permitted.

Accordingly the distribution operator 14b is able to balance the load on the power network, by periodically updating the access rules to ensure that there is sufficient electricity on the power network to meet demand.

For example, the consuming device 28 may include a usage rule that defines the type of device. The energy access point may include an access rule that states that a specific device (e.g. mobile phone) may not be charged in peak times. Accordingly, if the device is a mobile phone, electricity will not be provided if connected to the energy access point at a peak time.

In an alterative embodiment, the usage rules of the specific device 28 registered with the energy provider 18 are stored by the energy provider 18 in a memory (not shown). In this embodiment, once the device is authenticated, the usage rules are obtained from the energy provider using the communication network. In this case, the device 28 provides a unique identifier that identifies the device 28.

In a residential environment, the energy access point may not include the capability (e.g., a switch) to permit or prevent the transfer of energy. If the energy access point does not include the capability to permit or prevent the transfer of energy, the energy access point will authenticate devices and collect the device energy consumption based on trust (e.g. the device may report the energy consumption to the energy access point). The energy access point will send a report of the energy consumption to the distribution operator, which may handle the billing, for example by passing the energy usage information to an energy provider for billing. Therefore, even if the energy access point is unable to prevent or permit the transfer of energy it will communicate a signal to a device (e.g. permit or prevent signal), to act as a trusted environment in the same way that a physical switch may permit or prevent the transfer of energy.

FIG. 1 will now be described in context of the energy producing device 26. It will be understood that the process for consuming energy described for the consuming device 28, will be similar to energy producing for the producing device 26. Therefore, the aspects of the energy consuming device 28 apply to the energy producing device 26.

Referring to the producing device 26, details of the device 26 are communicated to an energy provider 20 to allow the device to be registered with the energy provider 20. This might also be carried out using the token system as described for the consuming device 28. The details for the producing device may include the type of device, manufacturer/model or the chosen payment method, for example. As shown in FIG. 1, the communication is illustrated by the solid line 50.

The producing device 26 may be a solar panel or battery that may be found in an electric vehicle. The communication between the producing device 26 and the energy provider 20 is similar to that between the consuming device 28 and the energy provider 18.

During the registration process of the producing device 26 it not necessary to transfer usage rules, since the device shown in the figure is only for producing or injecting energy into the power grid. However, a set of credentials, such as a digital certificate, a registration proof and access keys might also be communicated to the device 26. The access keys may include the energy provider's public key to allow authentication of the registration proof. The energy provider's public key may also be communicated to the distribution operator. The digital certificate may be in the form of an electronic document which uses a digital signature to bind a public key with an identity, as discussed for the consuming device.

The producing device 26 includes a memory device similar to that described for the consuming device 28. In this embodiment the memory (not shown) is used to store user-configured usage rules as described for the consuming device 28. The user-configured usage rules rule will be for the injection of energy, since device 26 is a producing device. The user-configured usage rules are set by the user. For example the user-configured usage rules may include rules determining when electricity can be provided from the producing device 26 to the power network 14. For example, the user of the device may only wish to provide electricity between the hours of 18:00 and 06:00 or only provide energy if the cost exceeds predetermined value. The user-configured usage rules for injecting energy into the power network may be referred to as injection rules. In this example, the user-configured usage rules are signed using a private key of the device.

The energy provider 20 is in communication with a distribution operator 14a. The communication between the energy provider and the distribution operator 14a is illustrated by the solid line 48. The communication may be performed over the Internet, where each node (i.e., the energy provider 20 and the distribution operator 14a) may have a specific Internet Protocol (IP) address. Alternative methods of communication may be used. The communication between the energy provider 20 and the distribution operator 14a may be via any form of wired or wireless network. The distribution operator 14a is similar to the distribution operator 14b.

The energy provider 20 is registered with the distribution operator 14a to provide energy in the form of electricity to the power network 14. The registration process is the same as that described for the energy provider 18.

An energy access point 22a is in communication with the distribution operator 14a via a local grid 12. The communication between the distribution operator 14a and the energy access point is illustrated by the solid black line 52. In this embodiment the energy access points 22a and 22b are both connected to the same local network 12. This is possible in this embodiment because the distribution operators 14a and 14b are in communication with one another as illustrated by the solid line 46. However, it will be appreciated that the energy access points 22a and 22b might be connected to different distribution operators via different local grids.

The communication between the distribution operator 14a and the energy access point 22a is similar to that described for the distribution operator 14b and the energy access point 22b. The energy access point 22a may be an electrical outlet in the home or an electrical outlet in a public place such as an airport or train. In this embodiment the device 26 is an energy producing device, therefore, it will be appreciated that the electrical outlet will be an energy inlet.

The energy access point 22a may receive from the distribution operator 14a, via the local network 12, the data (e.g., a public key) required to perform the digital signature verification of the device 26 that has been registered with the energy provider 20. As already described, the producing device 26 does not require any usage rules. Alternatively, the energy provider's key is stored in the memory of the device 26. The energy access point 22a will also receive from the distribution operator 14a, via the local network 12, one or more access rules, set by the distribution operator via the local network 12. The access rules are similar to those described for the energy access point 22a. In this example the distribution operator will sign the access rules using a private key of the distribution operator. The distribution operator's public key will be communicated to the energy access point 22a to allow for authentication of the access rules using the public key.

The energy access point 22a includes a storage device (not shown) for storing the data for performing the digital signature authentication for the device 26 and access rules. It will be appreciated that the energy access point 22a, may store the data for performing the digital signature authentication as described for the energy access point 22b.

The access rules and the eligible energy providers (i.e., the energy providers registered with the distribution operator) are regularly updated by the distribution operator 14a. This is achieved by periodically transmitting data to the energy access point 22a, which includes the access rules and the data (e.g. public key) for performing the digital signature authentication. This means that like the energy access point 22b, the energy access point 22a is not required to store a list of registered devices, rather a public key from the energy provider 20 is stored and used to authenticate producing device 26. This reduces the required storage space within the energy access point 22a. The energy access point 22a will operate in a similar manner to energy access point 22b.

The energy access point 22a is also electrically connected with the distribution operator via the local network 12. This is illustrated by the dashed line 54. This electrical connection may be a low, medium or high voltage line depending on the particular power infrastructure. It will be understood in this embodiment the energy access point will be providing electricity to the power grid. That is to say that the electricity is provided by the producing device 26 to the energy access point 22a, which is then transferred to the distribution operator 14a.

The producing device 26 is connected to the energy access point 22a when the user wishes to transfer energy to the grid. However, as described below, even though the device is connected to the energy access point 22a, the transfer of energy is based on a positive comparison (or positive evaluation) of the user-configured usage rules and the access rules.

For example, a user plugs their electric vehicle (producing device 26) into the energy access point 22a when not in use. The electrical connection between the consuming device 26 and the energy access point 22a is illustrated by the dashed line 60. In addition to the electrical connection 60, there may also be a separate communication line, as illustrated by the solid line 56. The communication line 56 may be in the form of a wireless connection, for example, Bluetooth, Zigbee, Wi-Fi or infrared. Alternatively, the communication line may be achieved using a separate cable, for example an Ethernet cable. It may also be possible to use a form of power line communication such that no separate wired or wireless connection is required.

When the device 26 is connected to the energy access point 22a and communication is established, the device 26 is authenticated with energy access point 22a. The energy access point 22a receives from the device 26 the access keys and digital certificate stored in the device 26. The digital certificate and access keys are used by the energy access point 22a to perform digital signature authentication using stored public keys. The public keys stored in the energy access point 22a may also be used to authenticate the access rules and the user-configured usage rules. It will be understood that the authentication process may be omitted.

After the device 26 is authenticated with the energy access point 22a, the user-configured usage rules stored in the device are compared with the access rules stored in the energy access point 22a. If there is a positive comparison, the transfer of energy between the consuming device 26 and the energy access point 22a is permitted. In other words, if the user-configured usage rules stored in the device match the access rules stored in the energy access point 22a, electricity is supplied to the energy access point 22a.

For example, the producing device 26 may include a user-configured usage rule that defines at what time of the day the producing device will permit energy to be transferred to the energy access point 22a. The producing device may also include a user-configured usage rule that defines the price at which electricity can be sold to the grid.

In the embodiment shown in FIG. 1, two different devices have been described, namely, a consuming device and a producing device. However, it will be appreciated that devices that consume and produce electricity may be used. For example, the battery in an electric vehicle can be used to consume and produce electricity, since it will be necessary to charge the battery, but it may also be possible to provide electricity back to the grid at specific times. For example, the user may chose to charge the battery during off-peak times, when the demand on the grid is lower. In peak times, when the demand for electricity is higher, the user can chose to provide electricity to the grid from the battery.

In FIG. 1, whether the device is for providing or consuming electricity a usage report may be produced. The usage report may include the amount of energy that is transferred between a device and an energy access point, in both directions. Such an energy report may be produced by the energy access point 22a, 22b and sent to the respective energy provider 18, 20, via the distribution operator. Alternatively, or in addition, the device may also produce a usage report that is sent to the energy provider. The energy access point may also sign the usage report with a private key of the energy access point. If the device produces a usage report, this may be signed using the device's private key. For authentication by the energy provider, a corresponding public key is communicated to the energy provider by the energy access point. If the usage report is signed using the device's private key, a corresponding public key is communicated to the energy provider for authentication by the energy provider, if not already present at the energy provider.

In embodiments, the usage rules, access rules, and user-configured usage rules have been described in the form of one or more rules. However, the rules (i.e. access, usage or user-configured) may be in the form of a single "rule" that includes a set of conditions. The conditions may be defined in any expression language or description operations. For example, the conditions for usage might include allowing a device to consume energy with no limits in a specified time frame or during energy peaks, a device is not allowed to consume more than 5 units of energy (e.g. kWh) in a predefined time period. An example condition of a user-configured usage rule may be consuming only green-energy. Example conditions for injection of electricity may include, allowing energy injection only in peak hours or allowing energy injection if the trading price is not lower than 0.1 Euro per unit of energy. Example conditions for access rules include in peak hours allowing only consumers categorized with a predefined priority, allowing injection only of green energy, or buying injected energy at 0.1 Euro per unit of energy.

Each of the different types of rules may include an identification, a registration date and expiration date, a role depending on the element (e.g., consumer unit, providing unit), and a usage priority. For example, devices might be assigned a priority rated from 1 to 3 depending on the type of device.

As described above, the different types of rule in the network are signed using different authentication or access keys (i.e. encryption keys) to ensure the integrity and confidentiality of the communication between the elements in the system. For example, the access rule may be signed using a distribution operator's private key, the usage rule may be signed using an energy provider's private key, and the user-configured usage rules may be signed using a device's (i.e. user's) private key. For each of these private keys, a public key may be generated, which is distributed around the power network to allow devices to transfer energy.

For example the access rule that is received by an energy access point is signed using the key from the distribution operator. When the energy access point accesses the access rule a key (i.e. distribution operator's public key) held by the energy access point is used. The distribution operator's key may have been transmitted prior to transmitting the access rule.

In embodiments, a private/public key encryption has been used, however, public cryptography may be used. In the case where public cryptography is used, an energy access point it not required to store the public key of any energy providers. The energy access point only stores the public key of the shared certification authority. Alternatively, a single secret key may be used throughout the distribution network. This single secret key may then be used for encryption and signing, using symmetric key algorithms.

In embodiments, the registration proof, the usage rules, and the device credentials may be further protected by employing separate encryption public/private key pairs for each of the involved parties, i.e., an encryption public/private key pair per party. This is typically done using a secure communication channel based on symmetric or/and public cryptography.

In embodiments reference is made to the transfer of energy between the electrical power network and a device (consuming or producing), which will be understood to include both the transfer of energy from the electrical power network to the device and from the device to the electrical power network. Furthermore, use of the power network includes the transfer of energy between the electrical power network and a device, or injection and consumption of energy by the device, as discussed above.

Figure 2:
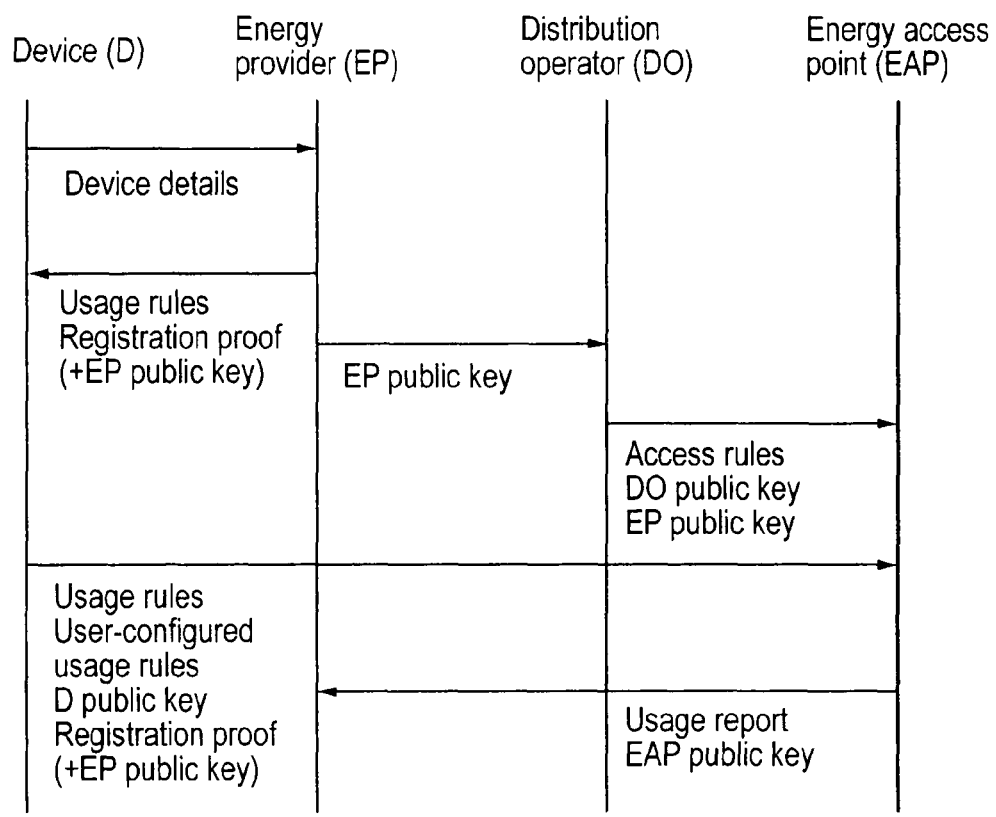
FIG. 2 illustrates schematically the flow of data between nodes of the power distribution network.

FIG. 2 illustrates schematically the flow of data between the various elements of the distribution network. The flow of data is shown between a device (D), an energy provider (EP), a distribution operator (DO) and an energy access point (EAP). The device communicates device specific details to the energy provider as discussed above. The energy provider registers the device and provides a registration proof to the device. If the registration proof is signed using the energy provider's private key, the energy provider's public key may be communicated to the device for authentication purposes. The energy provider also communicates a set of usage rules to the device, which may also be signed using the energy provider's private key. It will be understood that if the device is an energy producing device the energy provider does not provide usage rules to the device. The energy provider's public key is provided to the distribution operator in addition to or instead of being communicated to the device. The distribution operator communicates the access rules to the energy access point. If the energy access rules are signed by the distribution operator's private key, the distribution operator's public key is communicated to the energy point with the energy provider's public key. To enable the transfer of energy between the device and the energy access point, the device communicates the usage rules and any user-configured usage rules to the energy access point. The device also communicates the registration proof to the energy access point for authentication. Any public keys (e.g. the device's public key and the energy provider's public key) are also communicated to the energy access point. Once an amount of energy is transferred between the energy access point and the device, the energy access point communicates a usage report to the energy provider. The energy access point may also sign the usage report using the energy access point's private key. Thus a public key is also communicated to the energy provider to authenticate the usage report.

Figure 3:
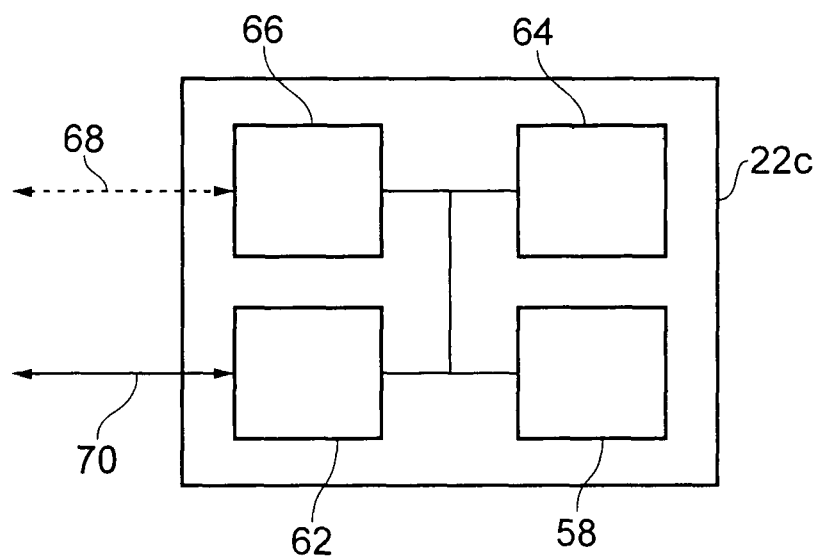
FIG. 3 shows an energy access point according to an embodiment of the invention.

FIG. 3 shows an energy access point 22c. The energy access point 22c includes a storage device 58, a processor 62, a communication module 64, and a programmable switch 66.

The storage device 58 may be in the form of a solid state memory (e.g., RAM or ROM), or a storage medium (e.g. hard drive). The storage device or memory is used to store access rules from a distribution operator, and public keys or access keys from the energy providers to allow authentication of devices that are connected to the energy access point.

The communication module 64 is used to communicate with devices connected to the energy access point and to receive updates from the energy provider and the distribution operators. The communication between the energy access point and other devices is illustrated by the solid line 70. However, as already discussed, the communication may be performed using a wired or wireless communication protocol. Furthermore, the type of communication protocol used between the energy access point and a device could be different than the type of communication protocol used between the energy access point and the energy provider, for example. The communication module will typically be controlled by the processor 62.

The switch 66 is connected a local grid via the connection illustrated by line 68. Depending on the nature of the energy access point, the electrical connection 68 might be bidirectional or unidirectional. The switch 66 is operable to allow energy (e.g., electricity) to be provided to a device or received from a device connected to the energy access point. As discussed above, in a residential environment, the energy access point 22c may not include the capability (e.g., switch 58) to permit or prevent the transfer of energy.

The processor 62 accesses the memory device 58 to retrieve the access rules and public keys to perform authentication of a connected device and to determine whether to allow energy to be transferred between the device and the energy access point. If the processor 62 determines that energy should be transferred, the processor controls the switch to allow the transfer of energy. It will be appreciated that the elements the energy access point 22c are shown in FIG. 3 as separate elements, however, these elements could also be contained within a single device.

It will be understood that it is possible to implement one energy access point with multiple outlets/inlets. These outlets/inlets each may have a switch. It is not mandatory to implement the outlets in the same enclosure as the energy access point. These could be physically separate in one, two or more enclosures, depending on the implementation.

Figure 4:
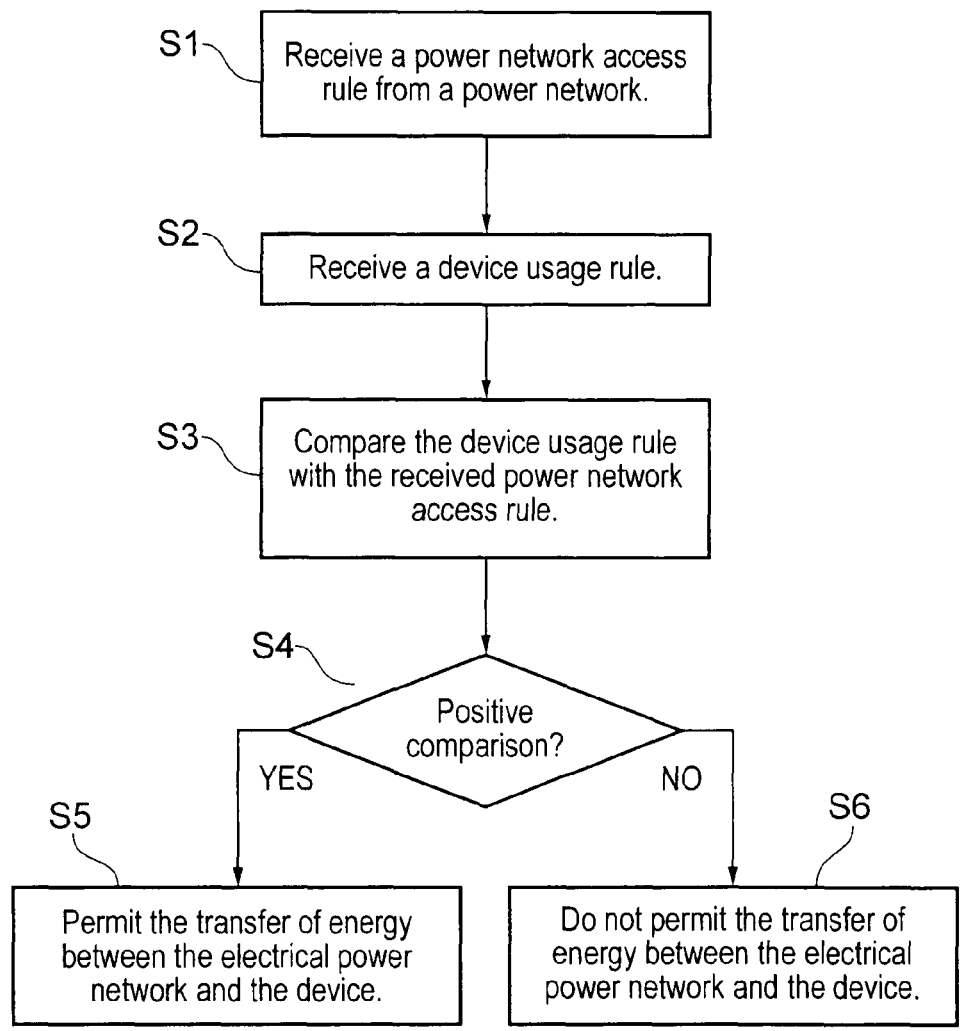
FIG. 4 shows a flow diagram illustrating the process flow for permitting the transfer of electricity according to an embodiment of the invention.

FIG. 4 shows a flow chart illustrating a method according to an embodiment of the invention.

In step 1, a power network access rule is received from a power network. The power network access rule defines an access condition which permits a device to access the power network.

In step 2, a device usage rule is received. The device usage rule defines a condition when the device is permitted use of the power network.

In step 3, the device usage rule is compared with (or evaluated against) the received power network access rule.

In step 4, it is determined whether there is positive comparison (or successful evaluation) between the device usage rule and the received power network access rule.

In step 5, the transfer of energy between the electrical power network and the device is permitted upon a positive comparison (or successful evaluation) between the device usage rule and the power network access rule.

In step 6, the transfer of energy between the electrical power network and the device is not permitted upon a negative comparison (or unsuccessful evaluation) between the device usage rule and the power network access rule.

Figure 5:
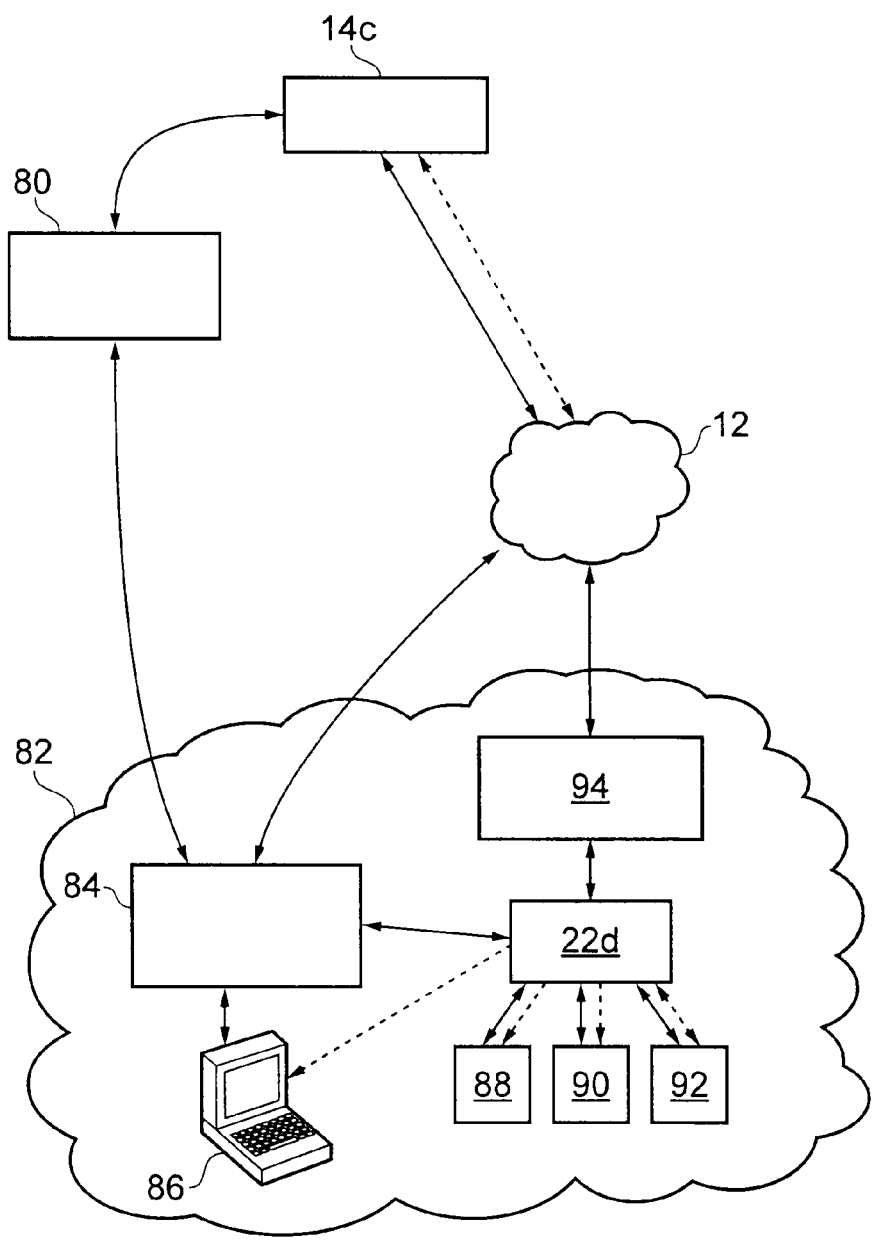
FIG. 5 shows a home network as part of the power distribution network according to an embodiment of the invention.

FIG. 5 illustrates schematically a home network 82 as part of an energy network according to an embodiment of the invention.

The home network 82 comprises a computer 86, a hub or network router 84, an energy access point 22*d*, three devices 88, 90, 92 and a consumer unit 94 connected to the energy access point. The power grid comprises similar elements to those illustrated in FIG. 1. The power grid includes a local grid 12, a distribution operator 14*c* and an energy provider 80. The communication lines and power lines are shown using solid lines and dashed lines respectively, as in FIG. 1.

In FIG. 5, the energy access point 22*d* is illustrated as being a separate unit that is connected to the consumer unit 94 and provides energy to the devices 88, 90, 92. However, it will be appreciated that in alternative embodiments the energy access point 22*d* may be integrated with the consumer unit 94, or integrated in a smart meter. That is to say that the energy access point 22*d* may be in the form of a series of fuses and circuit breakers arranged to distribute electricity in the home. Three devices are connected to the consumer unit, namely two electricity consuming devices 88, 90 (e.g., a washing machine and a television) and an electricity consuming and providing device 92 (e.g., an electric vehicle).

The consumer unit 22*d* (or energy access point) will be registered with the energy provider 80, as described above. In FIG. 5, this may be performed via the router 84 using the Internet. Indeed, in FIG. 5, consumer unit 22*d* is shown with a communication line with the local grid 12 and the energy provider 80 via the router 84.

As already described, energy will be transferred between the energy access point and the devices 88, 90, 92, depending on a positive comparison of access rules and usage rules within the energy access point 22*d*. It will be appreciated that the storage of usage rules, and authentication signatures and access keys might be performed by the computer 86. Furthermore the comparison of the usage rules and access rules and any authentication might also be performed by the computer 86.

The energy access point 22*d* may produce a report that details the amount of energy that has been transferred between the energy access point 22*d* and the distribution operator 14*c* via the local grid 12. The report may be transmitted to the energy provider or to the computer 86 so that the home owner is able to monitor the amount of energy that is consumed and produced.

The home arrangement shown in FIG. 5 shows an energy access point that controls the energy from the consumer unit to various devices in the home. In an alternative arrange inside the home the energy access point may not include a switch to prevent a device being supplied with energy. However, authentication with mobile devices may still be performed. If the mobile device is registered with an energy provided by the home owner the energy usage will be applied to the home owner. If a mobile device, not registered with the same energy provider of the home and owned by someone other than the home owner, is connected to the home-power-network the energy usage will be applied to the owner of the device and not the home owner. This is achieved by using trust between the energy access point and the mobile device not owned by the home owner. Once the energy transfer is complete the energy usage will be determined (e.g. the device communicates the energy usage to the energy access point in the form of a usage report). The energy access point then communicates the usage report to the distribution operator, which may forward the usage report to an energy provider. The energy provider then subtracts the energy usage for the home owner's bill and adds the usage to the owner of the mobile device.

The computer 86 may allow the user to interact with energy provider 18. In this case a user may be able to pre-buy electricity from an energy provider. This might be performed by accessing a website and booking a time-slot for transferring energy from an energy access point. This will allow the distribution network to balance the load on the power network more accurately, since it will be possible to better predict the load at a specific time. Since the power network can better predict the load on the grid the user might be offered the electricity at a preferential rate. The user may also be able to offset the consumption of electricity by agreeing to provide an equal amount of electricity back to the power network within a predefined period of time.

If a consumer pre-buys electricity for a specific time-slot, but does not consume the electricity, the energy provider may still charge the client or may agree with the user that the electricity may be consumed at another time at an increased rate than that agreed.

The above embodiments may be implemented as a computer program having computer readable instructions. The computer program will contain instructions that allow a computer to perform a method as hereinbefore described. Such a computer program may be embodied on a storage medium such as a CD-ROM or a solid state memory or any kind of storage device suitable for storing such a computer program. Moreover, the computer program may be embodied as signals which can be transferred over a network such as the Internet or any kind of local network.

Although illustrative embodiments of the invention have been described in detail herein with reference to the accompanying drawings, it is to be understood that the invention is not limited to those precise embodiments and that various changes and modifications can be effected therein by one skilled in the art without departing from the scope and spirit of the invention as defined by the appended claims.

We claim:

1. A method of controlling access to an electrical power network, comprising:
   receiving, at an energy access point, a power network access rule from a distribution operator via a power grid, the power network access rule defining an access condition which permits a device to access the power grid;
   receiving, at the energy access point, a device usage rule from the device, the device usage rule being a condition when the device is permitted use of the power grid, and the device usage rule being provided to and stored in the device from an energy provider during an initial registration of the device with the energy provider;
   comparing, at the energy access point, the device usage rule with the received power network access rule; and permitting, at the energy access point, transfer of energy between the power grid and the device upon a positive comparison between the device usage rule and the power network access rule, wherein the distribution operator provides a distribution network for the energy, and wherein the energy provider buys and sells the energy.

2. The method according to claim 1, comprising authenticating, at the energy access point, the device using authentication data from the energy provider.

3. The method according to claim 1, wherein the power network access rule is determined in accordance with a capacity of the power grid.

4. The method according to claim 1, wherein before receiving the power network access rule from the distribution operator via the power grid, the method comprising registering the device with the energy provider, the energy provider providing electricity over the power grid.

5. The method according to claim 1, wherein the device usage rule defines conditions for consuming electricity from the power grid.

6. The method according to claim 1, wherein the device usage rule defines conditions for providing electricity to the power grid.

7. The method according to claim 1, comprising:
receiving a user-configured usage rule, the user-configured usage rule defining a condition when the device requires use of the power grid as defined by a user;
comparing the user-configured usage rule with the received power network access rule; and
permitting the transfer of energy between the power grid and the device upon a positive comparison between the device usage rule and the power network access rule, and the user-configured usage rule and the power network access rule.

8. The method according to claim 1, wherein the device usage rule includes a predetermined amount of energy consumption of the device.

9. The method according to claim 1, wherein the power network access rule includes information regarding a voltage and frequency of the energy.

10. The method according to claim 1, wherein the power network access rule includes information regarding a maximum current of the energy.

11. The method according to claim 1, comprising:
measuring an amount of electricity that is transferred between the power grid and the device;
storing a value indicative of an amount of energy transferred; and
distributing a report over a network,
wherein the report includes the value indicative of the amount of energy transferred.

12. The method according to claim 11, wherein the network is a home network.

13. A non-transitory computer-readable storage medium storing computer-readable instructions which, when loaded onto a computer, configure the computer to perform a method according to claim 1.

14. The method according to claim 1, wherein the device receives a registration proof during the initial registration of the device with the energy provider, and wherein the registration proof includes energy account identification, an energy provider identification, a description of the device, a registration date, a registration expiration date, and a priority number corresponding to the device.

15. The method according to claim 1, comprising authenticating, at the energy access point, the device usage rule using authentication data from the energy provider.

16. The method according to claim 1, comprising:
receiving, at the energy access point, a registration proof from the device, wherein the device receives the registration proof during the initial registration of the device with the energy provider;
authenticating, at the energy access point, the device using authentication data from the energy provider and the registration proof;
authenticating, at the energy access point, the device usage rule using the authentication data from the energy provider; and
authenticating, at the energy access point, the power network access rule using authentication data from the distribution operator.

17. An apparatus for controlling access to an electrical power network, comprising:
circuitry configured to:
receive a power network access rule from a distribution operator via a power grid, the power network access rule defining an access condition which permits a device to access the power grid;
receive a device usage rule from the device, the device usage rule being a condition when the device is permitted use of the power grid, and the device usage rule being provided to and stored in the device from an energy provider during an initial registration of the device with the energy provider;
compare the device usage rule with the received power network access rule; and
permit transfer of energy between the power grid and the device upon a positive comparison between the device usage rule and the power network access rule,
wherein the distribution operator provides a distribution network for the energy, and
wherein the energy provider buys and sells the energy.

18. The apparatus according to claim 17, wherein the circuitry is configured to authenticate the device using authentication data from the energy provider.

19. The apparatus according to claim 17, wherein the power network access rule is determined in accordance with a capacity of the power grid.

20. The apparatus according to claim 17, wherein the device usage rule defines conditions for consuming electricity from the power grid.

21. The apparatus according to claim 17, wherein the device usage rule defines conditions for providing electricity to the power grid.

22. The apparatus according to claim 17, wherein the circuitry is configured to:
receive a user-configured usage rule, the user-configured usage rule defining a condition when the device requires use of the power grid as defined by a user;
compare the user-configured usage rule with the received power network access rule; and
permit the transfer of energy between the power grid and the device upon a positive comparison between the device usage rule and the power network access rule, and the user-configured usage rule and the power network access rule.

23. The apparatus according to claim 17, wherein the device usage rule includes a predetermined amount of energy consumption of the device.

24. The apparatus according to claim 17, wherein the power network access rule includes information regarding a voltage and frequency of the energy.

25. The apparatus according to claim 17, wherein the power network access rule includes information regarding a maximum current of the energy.

26. The apparatus according to claim 17, wherein the circuitry is configured to:
- measure an amount of electricity that is transferred between the power grid and the device;
- store a value indicative of an amount of energy transferred; and
- distribute a report over a network, wherein the report includes the value indicative of the amount of energy transferred.

27. The apparatus according to claim 26, wherein the network is a home network.

28. The apparatus according to claim 17, wherein the circuitry is configured to authenticate the device usage rule using authentication data from the energy provider.

29. The apparatus according to claim 17, wherein the circuitry is configured to:
- receive a registration proof from the device, wherein the device receives the registration proof during the initial registration of the device with the energy provider;
- authenticate the device using authentication data from the energy provider and the registration proof;
- authenticate the device usage rule using the authentication data from the energy provider; and
- authenticate the power network access rule using authentication data from the distribution operator.

* * * * *